(No Model.)
J. G. BRADLEY.
ROLLING CULTIVATOR AND PULVERIZER.
No. 323,266. Patented July 28, 1885.
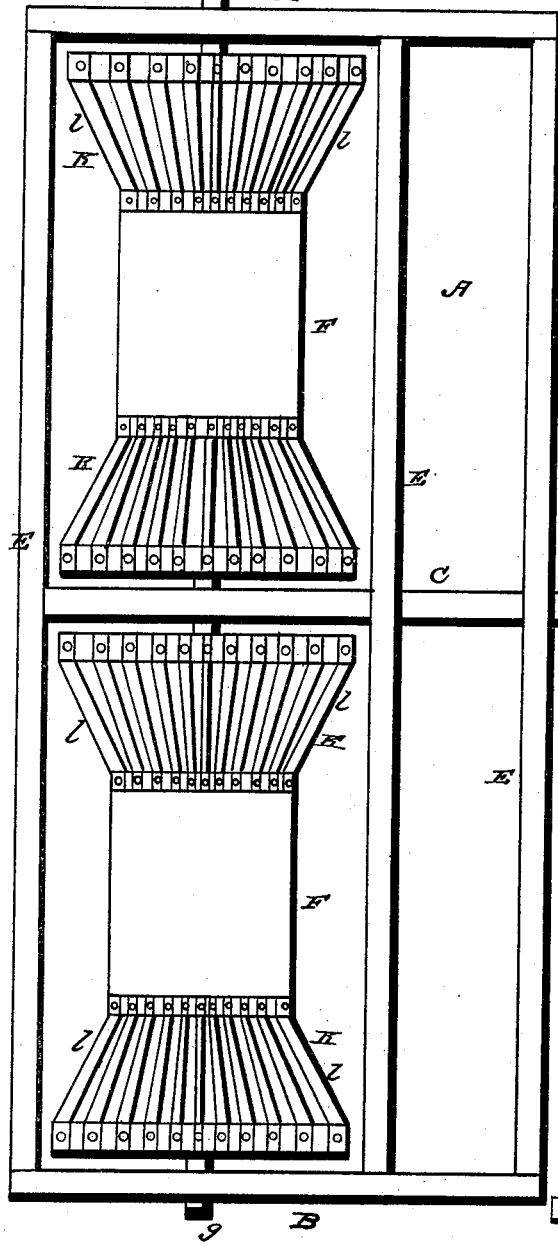
Fig. 1
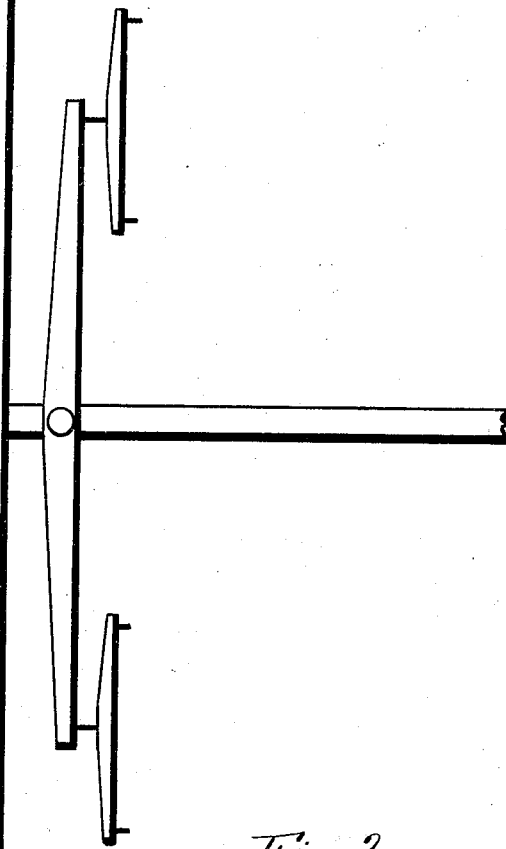
Fig. 2.
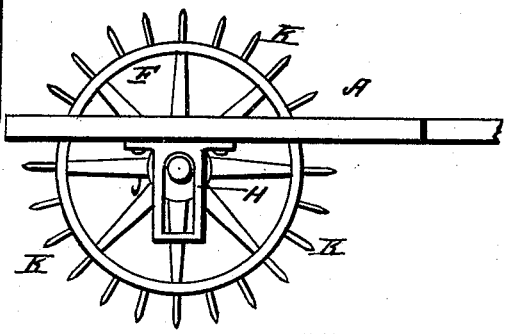
WITNESSES
E. H. Bates
P. C. Masi
INVENTOR
Joseph G. Bradley
by Anderson & Smith
his ATTORNEYS

United States Patent Office.

JOSEPH G. BRADLEY, OF WETMORE, KANSAS.

ROLLING CULTIVATOR AND PULVERIZER.

SPECIFICATION forming part of Letters Patent No. 323,266, dated July 28, 1885.

Application filed August 16, 1884. (No model.)

*To all whom it may concern:*

Be it known that I, JOSEPH G. BRADLEY, a citizen of the United States, residing at Wetmore, in the county of Nemaha and State of Kansas, have invented certain new and useful Improvements in Rolling Cultivators and Pulverizers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a plan view of my device, and Fig. 2 is a side view of the same.

This invention has relation to rolling cultivators and pulverizers for listed corn; and it consists in the construction and novel arrangement of devices as hereinafter set forth, and pointed out in the appended claims.

In the accompanying drawings, the letter A designates the frame, which is constructed in rectangular form, having the side bars, B, center bar, C, and cross-bars E.

F F indicate the rollers, which are usually made in cylindrical form, their journals $g$ engaging vertical slot-bearings H, which are bolted to the side bars and center bar. These bearings are designed to afford sufficient play to the roller-journals to enable the rollers to accommodate themselves to uneven places in moving over the ground. In this way the machine is rendered capable of operating upon portions of ground which would otherwise escape its action. In some cases the rollers are constructed with end flanges, which may be beveled on the inside.

K K indicate knives, which are attached to the rollers. Each roller is provided at each end with a series of these knives, K, which have their planes radial, or nearly so, and are formed with oblique or inclined cutting-edges $l$, said cutting-edges having an angular direction of from thirty degrees to forty-five degrees with reference to the axis of the roller. Each knife, therefore, has its cutting-edge commencing at the roller-surface, somewhat to one side of its middle, and thence extending outward gradually, reaching its full depth at the end of the roller. These knives are preferably made with open places or intervals in the blades near to or next to the roller-surface, to aid their pulverizing or crumbling action. The knives may be attached to annular bands adapted to be secured to the rollers, or they may be made with flanges, which are perforated for the passage of screws or bolts. The distance between the inner ends of the two rollers is usually about eight inches, this being sufficient to avoid injury to the growing corn.

This machine is only designed to be used on listed corn, or corn which is planted in a ditch from which the earth has been thrown upward and outward on both sides. The corn so planted is liable to be choked by weeds growing rapidly in the soil which has been thrown up above the level of the corn channel or ditch. This pulverizing and cutting roller serves an excellent purpose in this respect. Its knives, which are from three to six inches apart, as the machine is drawn along act on the inclined lateral portions of the raised hills between the corn-rows, cutting down the weeds and breaking up and pulverizing the soil.

Having described this invention, what I claim, and desire to secure by Letters Patent, is—

1. In a rolling cultivator and pulverizer, the combination of the rollers provided with journals $g$, revolving in vertically-slotted bearings H, and the end series of vertical knives, K, having their cutting-edges $l$ commencing near the middle of each roller and inclined outward, attaining their full depth at the ends of the roller, substantially as specified.

2. In a rolling cultivator and pulverizer, the combination of the rollers provided at each end with a series of radial knives having inclined cutting-edges $l$ of greatest depth at the ends of the roller, and thence gradually extending to the roller-surface near its middle at an angle of from thirty degrees to forty-five degrees, substantially as specified.

In testimony whereof I affix my signature in presence of two witnesses.

JOSEPH G. BRADLEY.

Witnesses:
W. A. CORBETT,
O. J. BUSHNELL.